Oct. 12, 1965
N. E. KURTZ
3,210,898
MOUNTING CLIP AND WALL SUPPORT
Filed Aug. 22, 1960
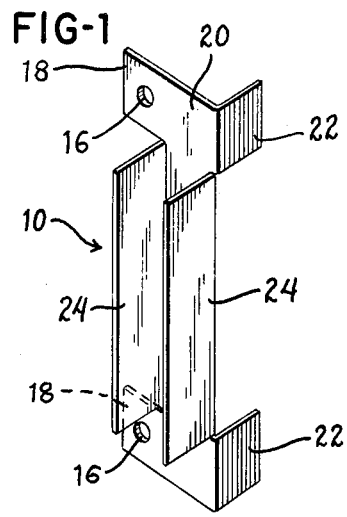
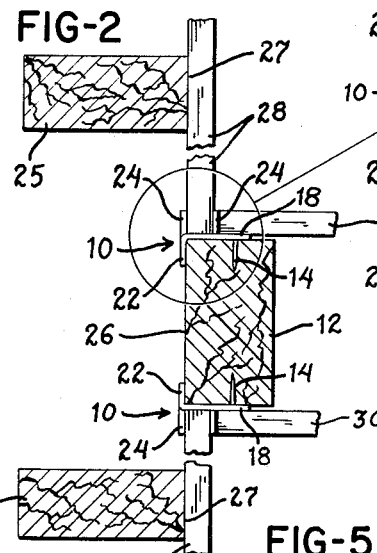
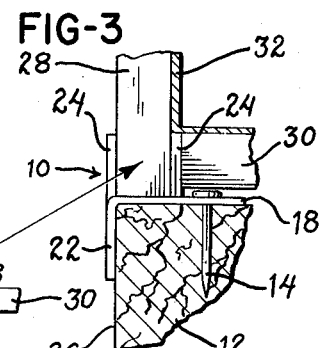
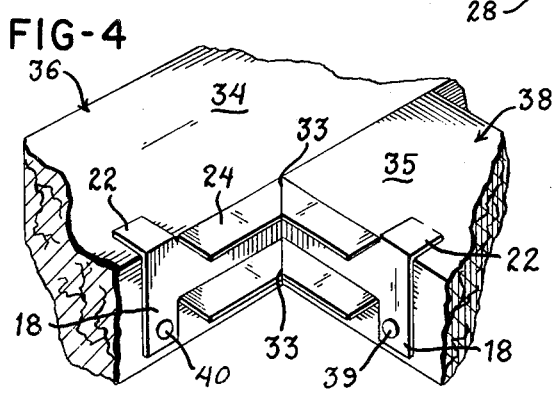
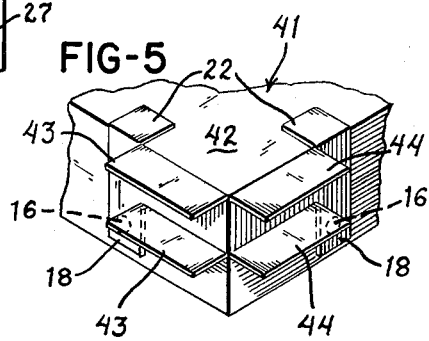
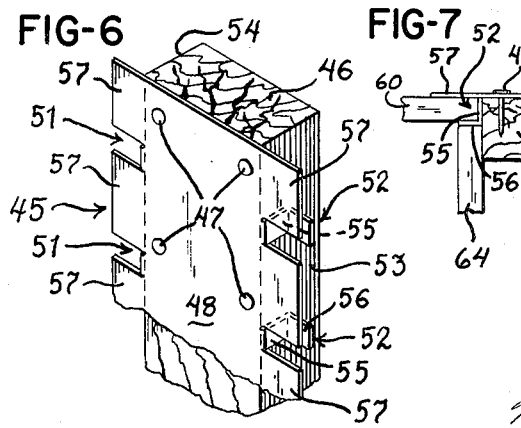
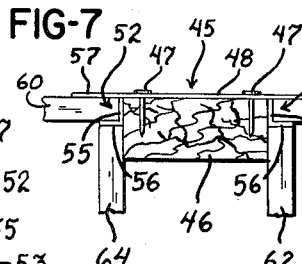
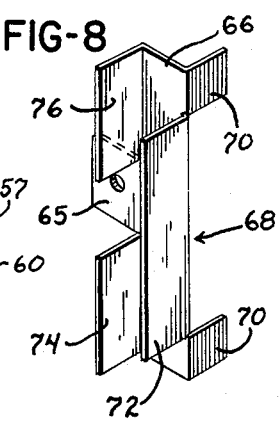
INVENTOR.
NED E. KURTZ
BY
Marechal, Biebel, French & Bugg
ATTORNEYS

United States Patent Office 3,210,898
Patented Oct. 12, 1965

1

3,210,898
MOUNTING CLIP AND WALL SUPPORT
Ned E. Kurtz, 321 Winterset Drive, Englewood, Ohio
Filed Aug. 22, 1960, Ser. No. 50,997
3 Claims. (Cl. 52—281)

This invention relates to a mounting clip arrangement for securing a sheet of dry wall to a supporting member.

The invention has particular application to the securing of a partition wall to the interior portion of an outer wall in such instances where this connection occurs at a point between supporting studs. For example, where a second bathroom is to be added off the main bedrooms, or in instances where a large closet is provided between two rooms, a situation may be encountered where it is necessary to place a partition wall between two studs.

In the usual arrangement, the outer wall is affixed to supporting studs which are spaced sixteen inches from their respective midpoints. In a situation where a partition is to be located between the spaced supporting studs, the procedure heretofore has been to provide an additional pair of studs in the outer wall to which the inner partition walls are affixed. According to the present invention the use of the additional stud is eliminated by the provision of a novel clip assembly for mounting and retaining the dry wall on a single supporting stud which also forms a part of the partition.

Thus it is an object of this invention to provide a mounting clip for dry wall sheet which may be conveniently fixed to a supporting member such that the clip is covered by the wall sheets and concealed thereby.

A further object of this invention is to provide a metal clip for a dry wall which eliminates the need for an additional pair of studs in those instances where the wall partition is to be erected between the spaced studding.

It is another object of this invention to provide a mounting clip assembly for a dry wall which is easily converted into an inside corner clip by mitering the center section of the clip or which includes two mounting clips affixed to the inside corner of a supporting structure for affixing dry walls thereto, such as ceiling dry walls.

A further object of this invention is to provide a mounting clip which is easily converted into an outside corner clip by cutting through a portion of the channel member and bending the clip to fit the corner of a supporting structure, or in the alternative to provide a mounting clip which is usable in paired arrangement to provide an outside corner clip supporting dry wall to be used as ceiling members.

Other objects and advantages of the invention will be apparent from the following description, the accompanying drawing and the appended claims.

In the drawing:

FIG. 1 is a view in perspective of a mounting clip constructed in accordance with the present invention;

FIG. 2 is a plan view of a wall section illustrating the manner of forming a partition between two supporting members by use of the wall clip of the present invention;

FIG. 3 is a view on enlarged scale of the wall clip mounting arrangement shown in FIG. 2;

FIG. 4 is a modified form of the clip shown in FIG. 1 and adapted to be employed as an inside corner clip;

FIG. 5 is a modified form of the clip shown in FIG. 1 and adapted to be employed as an outside corner clip;

FIGS. 6 and 7 show a modified form of clip embodying the principles of the clip shown in FIG. 1; and FIG. 8 is a further modification of the clip shown in FIG. 1.

Referring to the drawing, which illustrates preferred embodiments of the invention, the clip 10 in FIGS. 1–3 is adapted to be secured to a stud 12 or other supporting member by means of a nail 14, or other suitable means, which is placed through the aperture 16 of the flanged tabs 18. The clip 10 is preferably formed of a single sheet of metal of suitable thickness to provide a main body portion 20 with the flanged tabs 18 integral with and extending laterally therefrom and positioned generally in the same plane as the body portion 20. Located opposite the flanged tabs 18 are a pair of locating tabs 22, which are deformed to rest in a plane perpendicular to the plane of the flanged tabs 18 and main body portion 20.

Interposed between locating tabs 22 and the flanged tabs 18 is a pair of channel flanges 24 which extend in a plane parallel to the plane of the main body portion 20 and generally coinciding with the plane of the locating tabs 22. A sheet of dry wall is inserted in the wall receiving portion defined between the channel flanges 24, and the width of the body portion in the areas of the channel flanges may be varied in accordance with the width of the dry wall being used.

In instances where it is desired to space a partition wall between two conventionally positioned studs such as are shown at 25 in FIG. 2, the prior practice has required the use of an additional closely spaced pair of studs between the studs 25 and in line with the partition wall. In accordance with the present invention, such additionary pair of studs is unnecessary, and the connection between the main wall and the partition wall requires only the single stud 12 which is also the end stud of the partition wall.

Referring particularly to FIGS. 2 and 3, the stud 12 is located with its wide outer surface 26 in line with the inner edge surfaces 27 of the studs 25 to which the dry wall sheets 28 of the main wall are nailed in the usual way. A plurality of vertically spaced mounting clips 10 are secured to the narrow faces of the stud 12, as by nails 14, with the tabs 22 overlapping the stud face 26. The dry wall sheets 28 are arranged with their edges inserted in the channels formed by the flanges 24 and are secured in these positions by nailing to stud 25. Additional dry wall sheets 30 for the partition wall are then erected with their edges butting the interior flanges 24 and overlapping the tabs 18, and they are secured in these positions by nailing directly to the stud 12 and to the additional similar studs which are located along the interior of the partition wall.

As best seen in FIG. 3, the size of the channel flanges 24 is proportioned so that the inner ones of these flanges are effectively concealed by the ends of the dry wall sheets 30. In addition, the joint between the two sections 28 and 30 of the dry wall may be finished by the use of a finishing tape 32 in accordance with conventional practice.

The clip as shown in FIG. 1 may also be employed as an inside corner clip and secured to the top of a partition to support a dry wall ceiling member as shown in FIG. 4. In such cases, the channel flanges 24 are mitered as at 33 and the clip is bent on itself as shown in the drawing. Each of the locating tabs 22 is positioned on a surface 34 and 35 of the supporting members 36 and 38 and the clip is affixed to these supporting members by nails 39 and 40 which pass through the flanged tabs to secure the clip to the inside corner of the intersecting support members. The dry wall is now inserted between the right angle wall receiving portion defined by the mitered channel members 24, at least one of which is positioned in a plane coinciding with the plane defined by surfaces 34 and 35. The side walls are then affixed so that they intersect as shown in FIGS. 1 and 2. The nails 39 and 40 are not exposed since the top section of the wall board abuts the lower channel flange 24 and covers each of the nails.

Use of the clip of the present invention as an outside corner clip for supporting a dry wall ceiling member is shown in FIG. 5 wherein the channel flanges have been cut and the clip bent in a direction opposite to that shown in FIG. 4 and secured to a supporting member 41. The outside clip is affixed in similar fashion as above described by driving a nail through the apertures provided at 16 in the flanged tabs 18 and employing the locating tabs 22 which engage the common surface 42 to position the clip on the outside corner of the supporting member 41. The pairs of channel flanges 43 and 44 now define a pair of spaced dry wall receiving portions which are positioned at right angles to each other. As was the case with the inside corner clip, at least one channel flange of each pair of channel flanges is arranged to rest in a plane generally coinciding with the plane of the common surface 42.

Referring now to FIGS. 6 and 7 the modified clip 45 is shown mounted on a supporting stud 46 and effectively accomplishes the same desirable ends as is accomplished by the clip shown in FIGS. 1 through 3, but this clip requires additional material. The clip 45 is affixed to the studding 46 by nails 47, or other suitable means, which extend through a body portion 48 in such manner that the dry wall receiving portions 51 and 52 are positioned on opposed surfaces 53 and 54 of the supporting stud. Each of the portions 51–52 includes a seat section 55 bounded on one side by a flap 56 in generally parallel relationship with the tabs 57 which extend laterally from and generally in the same plane as the main body portion. The dry wall receiving portions 51 and 52 are spaced a sufficient distance apart to receive the supporting stud 46, and it is understood that the width of the main body portion may be varied in accordance with variations in size of the stud. As with the embodiment of FIGS. 1–3, the clip 45 is entirely concealed by the dry walls 60 which are inserted in the dry wall receiving portions 51 and 52, and the dry walls 62 and 64 which abut the one surface of the clip 45.

A further modification of mounting clip constructed in accordance with the principles of this invention is shown in FIG. 8 wherein a single flanged tab 65 projects laterally from the main body portion 66. This clip 68 is also provided with a plurality of locating tabs 70 which perform the same functions as did the locating tabs 22 in the above described clip. A dry wall receiving portion defined by the pairs of channel flanges 72, 74 and flange 76 which extend in parallel relationship and rest in a plane generally perpendicular to the plane of the main body portion 66. Mounting of this clip on the supporting stud is accomplished in the same manner as described in connection with the clip in FIG. 1.

It is also possible to employ the clips shown in FIGS. 1 and 8 as inside or outside corner clips as can be understood with reference to FIGS. 4 and 5 for example. When a pair of clips such as 10 or 68 is employed as an inside corner clip, one is affixed to each of the supporting members 36 and 38 to define a ceiling dry wall receiving portion, and it is understood that the channel flanges will not be in abutting relationship as shown in FIG. 4 due to the intervening spacing provided by the flanged tabs.

In the case of the outside corner clip shown in FIG. 5, the use of a plurality of clips such as 10 or 68 effectively accomplishes the same purpose, but the channel portions define a longer dry wall receiving portion due to the fact that the entire length of the channel portion of each clip is employed on each side of the supporting member 41.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:
1. A wall supporting structure for affixing a dry wall partition in intersecting relation to another dry wall partition comprising support stud means, a metallic mounting clip on said support stud means for affixing dry wall thereto, said mounting clip including a planar elongated body provided with a pair of longitudinally spaced nailing tabs, one of said tabs being at each end of said body portion and extending laterally from said body portion and in the same plane therewith, said nailing tabs being secured to one surface of said support stud means, a pair of spaced locating tabs integral with said body portion forming a transverse continuation of said nailing tabs and being perpendicularly disposed with respect to the plane of said body portion, said locating tabs engaging an adjacent surface of said support stud means, a pair of spaced channel flanges integral with said body portion and located longitudinally intermediate said locating tabs, one of said channel flanges being in the same plane as said locating tabs and extending from the opposite side of said planar body, the other of said channel flanges being spaced from said one channel flange and parallel therewith, the surface of said body portion opposite said channel flanges being in contact with said adjacent surface of said support stud means, said channel flanges and said body portion therebetween defining a dry wall receiving portion whereby said dry wall extends in a direction perpendicular to said adjacent surface and parallel to said first surface, the length of said channel flanges being greater than the length of said locating tabs, said locating tabs terminating in free edges, and the other of said channel flanges projecting from said body portion a distance substantially equal to the spacing between said channel flanges whereby said other channel flange is concealed by said intersecting dry wall.

2. A wall structure as set forth in claim 1, wherein said support stud means in an outside corner and wherein said elongated body portion is bent to engage the outside corner of said support stud means, said pair of nailing tabs being disposed to engage each surface of the outside corner of said support stud means, said pair of locating tabs being positioned to engage a common surface of said support stud means, and said channel flange means including two pairs of channel flanges each of which is positioned to lie in a plane generally coinciding with the plane of said common surface.

3. A wall structure as set forth in claim 1, wherein said support stud means is an inside corner and wherein said elongated body portion is bent to engage the inside corners of said support stud means, said spaced nailing tabs being disposed to engage one surface of said inside corner, said pair of locating tabs being disposed to engage a surface of said support stud means in the same plane, and said channel flange means including a pair of channel flanges defining a right angle dry wall receiving portion.

References Cited by the Examiner

UNITED STATES PATENTS

| | | | |
|---|---|---|---|
| 533,659 | 2/95 | Meyenberg | 20—94 X |
| 790,009 | 5/05 | Streeter | 189—35 X |
| 1,193,833 | 8/16 | Sherman | 20—92 X |
| 1,831,162 | 11/31 | Crowell | 20—92 |
| 2,039,125 | 4/36 | Stuart | 20—92 |
| 2,168,911 | 8/39 | Meyer | 20—92 X |
| 2,275,275 | 3/42 | Wilson et al. | 20—2 |

FOREIGN PATENTS 126,745   7/28   Switzerland.

EARL J. WITMER, *Primary Examiner.*

WILLIAM I. MUSHAKE, JACOB L. NACKENOFF,
*Examiners.*